US011858678B2

(12) United States Patent
Jian et al.

(10) Patent No.: US 11,858,678 B2
(45) Date of Patent: Jan. 2, 2024

(54) CONTAINER

(71) Applicant: HOREN CORTP CO., LTD., Shanghai (CN)

(72) Inventors: Yuanli Jian, Shanghai (CN); Long Feng, Shanghai (CN)

(73) Assignee: HOREN CORTP CO., LTD., Shanghai (CN)

( * ) Notice: Subject to any disclaimer, the term of this patent is extended or adjusted under 35 U.S.C. 154(b) by 0 days.

(21) Appl. No.: 17/760,058

(22) PCT Filed: Feb. 2, 2021

(86) PCT No.: PCT/CN2021/074856
§ 371 (c)(1),
(2) Date: Aug. 3, 2022

(87) PCT Pub. No.: WO2021/155784
PCT Pub. Date: Aug. 12, 2021

(65) Prior Publication Data
US 2022/0396411 A1     Dec. 15, 2022

(30) Foreign Application Priority Data

Feb. 3, 2020    (CN) .......................... 202010079132.3

(51) Int. Cl.
*B65D 19/06*      (2006.01)
*B65D 83/00*      (2006.01)
(Continued)

(52) U.S. Cl.
CPC ............. *B65D 83/00* (2013.01); *B65D 19/06* (2013.01); *B65D 19/40* (2013.01); *B65D 77/061* (2013.01); *B65D 2519/00323* (2013.01)

(58) Field of Classification Search
CPC ......... B65D 19/06; B65D 19/18; B65D 83/00
(Continued)

(56) References Cited

U.S. PATENT DOCUMENTS 5,474,197 A    12/1995   Hillis et al.
6,776,300 B2 *   8/2004   Walsh .................... B65D 19/18
                                                  206/386
(Continued)

FOREIGN PATENT DOCUMENTS

CN          1328514 A     12/2001
CN      202115803 U      1/2012
(Continued)

OTHER PUBLICATIONS

International Search Report (with English translation) and Written Opinion issued in PCT/CN2021/074856, dated Apr. 9, 2021, 11 pages provided.

(Continued)

*Primary Examiner* — Jacob K Ackun
(74) *Attorney, Agent, or Firm* — Hamre, Schumann, Mueller & Larson, P.C.

(57) ABSTRACT

The invention discloses a container, comprising a base and a side panel, the base or the side panel is provided with a discharging port, the discharging port is provided with a covering door, and the covering door is connected to the base or the side panel through a connecting device, wherein the connection device includes a transmission member and an elastic member. During the opening or closing process of the covering door, the transmission member can be driven to move outwardly, so that the elastic member is compressed. When the covering door is completely opened or closed, the elastic member springs back and drives the transmission member to move inwardly, the covering door automatically keeps open or closed. The overall structure of the invention is novel and reliable, and the operation is simple, and it is not necessary to confirm whether the covering door is attracted in place during the opening or closing process of the
(Continued)

covering door, which can effectively avoid human operation errors.

16 Claims, 14 Drawing Sheets

(51) Int. Cl.
   *B65D 19/40* (2006.01)
   *B65D 77/06* (2006.01)
(58) Field of Classification Search
   USPC .......................................... 206/386
   See application file for complete search history.
(56) References Cited

U.S. PATENT DOCUMENTS

| | | | |
|---|---|---|---|
| 2002/0130128 A1 | 9/2002 | Berglund | |
| 2005/0014563 A1 | 1/2005 | Barri | |
| 2005/0145639 A1 | 7/2005 | Viklund et al. | |
| 2015/0191281 A1* | 7/2015 | Jian | B65D 19/06 |
| | | | 220/315 |
| 2015/0225137 A1* | 8/2015 | Wei | B65D 19/06 |
| | | | 220/230 |

FOREIGN PATENT DOCUMENTS

| | | |
|---|---|---|
| CN | 102785829 A | 11/2012 |
| CN | 103754516 A | 4/2014 |
| CN | 111169790 A | 5/2020 |
| CN | 211970215 U | 11/2020 |
| JP | S53104128 U | 8/1978 |
| JP | S57140354 U | 9/1982 |
| JP | H06035194 U | 5/1994 |
| JP | H08198294 A | 8/1996 |
| JP | 2002068182 A | 3/2002 |
| JP | 2019117755 A | 7/2019 |
| JP | 2019143738 A | 8/2019 |
| WO | 2012058059 A1 | 5/2012 |
| WO | 2016096657 A1 | 6/2016 |

OTHER PUBLICATIONS

Office Action issued in Office Action issued in Japanese Application No. 2022547141, dated Aug. 1, 2023, with English machine translation.

* cited by examiner

CONTAINER

TECHNICAL FIELD

The invention relates to the field of logistics and transportation, in particular to a container.

TECHNICAL BACKGROUND

A container, which can carry various kinds of goods, is widely used for temporary storage or transportation due to its standard size and convenience in movement.

For the convenience of description, liquid bulk containers are taken as an example. These containers are mainly used for loading and unloading various liquid cargoes. Most of the early bulk liquid containers were hollow barrels with large volumes. Such containers have large recovery volumes, and their interiors are not easy to clean, which may easily cause secondary pollution; now there is a new type of liquid packaging and transportation box on the market. This type of box has a bottom and two pairs of opposite side panels, and a plastic liner used with it is located in the box. When loading the goods, the goods are injected from the filling port on the plastic liner, and when discharging, the goods are discharged through the discharging port at the lower position on the side of the container. Since the side panels of such containers are foldable and the matching plastic liner is a disposable product, the recycling volume is reduced and secondary pollution is avoided.

However, the discharging port of such containers generally needs to be covered by a covering door to achieve dustproof and anti-tampering effects. At present, most of the common covering doors are a plate-shaped integral piece, which is turned and bent by using the flexibility of plastic to achieve the opening and closing functions of the covering door. The solution disclosed in a patent is that one end of the covering door is provided with a buckle to be installed in conjunction with the base, and the other end of the covering door and the corresponding position on the side panel after it is turned over are equipped with magnets or the like, and at the same time, a crease for turning over is generally provided at the position below the upper edge of the covering door by a certain distance, so that when the covering door is turned over upwardly and opened, it can be attracted with the side panel, thereby maintaining the opening state of the covering door. When closing the covering door, the covering door need to be turned over so that it is attached to the base. In this way, the covering door can be opened and closed to facilitate the discharging of goods.

However, after feedback from the actual use of the market, there are some disadvantages of this type of covering door. Because this type of covering door is turned over and bend due to the flexibility of plastic and fixed bend with magnet attraction. This requires the operator to be very careful to ensure that the covering door and the magnet are attracted. If the covering door is not completely opened or closed, and the magnetic attraction distance is not reached, the covering door will remain tilted and protrude from the box, occupying space outside the box. When the boxes are stacked on each other, it is easy to hit the covering door, resulting in damage to the covering door. For the part of the flexible connection, because its thickness cannot be too thick (usually the thickness is not more than 0.5 mm), the strength of the whole covering door is limited, which affects the service life.

Sum up, in order to reduce error in operation, reduce the damage chance of the covering door during actual use, and improve the operating experience, how to keep the door automatically open or closed has become a new research and development topic.

SUMMARY

The object of the present invention is to provide a container to solve the above-mentioned problems in the prior art.

In order to solve the above problems, according to one aspect of the present invention, a container is provided, comprising a base and side panels, the base or the side panel is provided with a discharging port, the discharging port is provided with a covering door, and the covering door is connected to the base or the side panel by a connecting device, characterized in that, the connecting device comprises a transmission member and an elastic member; wherein during the opening or closing process of the covering door, the transmission member is driven to move outwardly, so that the elastic member is compressed; when the covering door is completely opened or closed, the elastic member springs back and drives the transmission member to move inwardly, and the covering door automatically keeps open or closed.

In an embodiment, the side panel or the base is provided with an accommodating cavity for accommodating the covering door, the accommodating cavity is arranged in the outside of the discharging port, and the covering door is provided with an arc surface on the top thereof, and the arc surface cooperates with an outer surface of the top of the accommodating cavity during the opening or closing process of the covering door.

In an embodiment, the covering door is rotated to open or close around an axis, and the distance between the axis and a top end of the covering door is greater than the distance between the axis and the bottom surface of the covering door and the distance between the axis and the front surface of the covering door.

In an embodiment, the covering door is provided with a shaft hole, and the transmission member is rotatably connected to the covering door through a pin shaft, wherein the distance between the shaft hole and the top end of the covering door is greater than the distance between the shaft hole and the bottom surface of the covering door and the distance between the shaft hole and the front surface of the covering door.

In an embodiment, the connecting device further comprises a pin shaft, and one end of the transmission member is provided with a pin shaft hole, the transmission member is rotatably connected with the covering door through cooperation of the pin shaft with the pin shaft hole in the transmission member and the shaft hole in the covering door.

In an embodiment, the end of the transmission member where the pin shaft hole is provided is provided with an arc surface, and during the opening or closing process of the covering door, the bottom of the connection groove in the covering door cooperates with the arc surface.

In an embodiment, the discharging port is provided in the base, and the base is further provided with an accommodating cavity for accommodating a covering door, the accommodating cavity is arranged in the outside of the discharging port, grooves are respectively provided on both sides of the upper portion of the accommodating cavity, one end of the connecting device is rotatably connected to the covering door, and the other end of the connecting device is installed in the groove.

In an embodiment, the connecting device further comprises a fixing member, the bottom of the groove is provided with a buckle groove, the fixing member is provided with a buckle, and the fixing member is fixedly connected to the base through the cooperation between the buckle and the buckle groove.

In an embodiment, the covering door comprises a covering plate, one end of the covering plate is provided with a protruding portion, two sides of the protruding portion are respectively provided with connecting grooves, and one end of the connecting device is rotatably connected in the connecting groove.

In an embodiment, the top ends of the protruding portions at both sides of the connecting groove are provided with arc surfaces, and the arc surfaces cooperate with the outer surface of the top of the accommodating cavity during the opening and closing process of the covering door.

In an embodiment, the protruding portion is a boss whose front surface protrudes upwardly, and when the covering plate is in a closed state, the covering plate sinks into the accommodating cavity in the side of the base.

In an embodiment, the transmission member is provided with a mounting hole, a side wall of the mounting hole is provided with an elastic member mounting portion, and the fixing member and the elastic member are mounted in the mounting hole, wherein the fixing member is provided with an opening, a boss is provided in the opening, one end of the elastic member is installed on the elastic member mounting portion, and the other end of the elastic member is installed on the boss.

In an embodiment, the boss of the fixing member is disposed on a side wall of the buckle facing the opening.

In an embodiment, the elastic member is a spring, one end of the spring is fixed on the mounting portion of the transmission member, and the other end of the spring is fixed on the boss of the fixing member.

In an embodiment, a small door is provided on the side panel, and the discharging port is provided on the base below the small door.

According to another aspect of the present invention, there is also provided a container, comprising a base and side panels, the base or the side panel is provided with a discharging port, the discharging port is provided with a covering door, the covering door is connected to the base or the side panel by a connecting device, wherein the connecting device includes an elastic member, the elastic member is elastically deformed during the opening or closing process of the covering door, and when the covering door is completely opened or closed, the elastic member resets and drives the covering door to automatically keep open or closed.

The discharging port of the container of the present invention adopts the form of a covering door, a fixing member, a transmission member and an elastic member that cooperate with each other. During the opening or closing process of the covering door, the covering door drives the transmission member to move outwardly, and the elastic member is compressed. When the covering door is completely opened or closed, the elastic member springs back and the transmission member moves inwardly, thereby ensuring that the covering door automatically keeps open or closed. The overall structure of the container is novel and reliable, and the operation thereof is simple. There is no need to confirm whether the covering door is attracted in place during the opening or closing process of the covering door, which can effectively avoid human operation errors.

EMBODIMENTS

Figure 1:
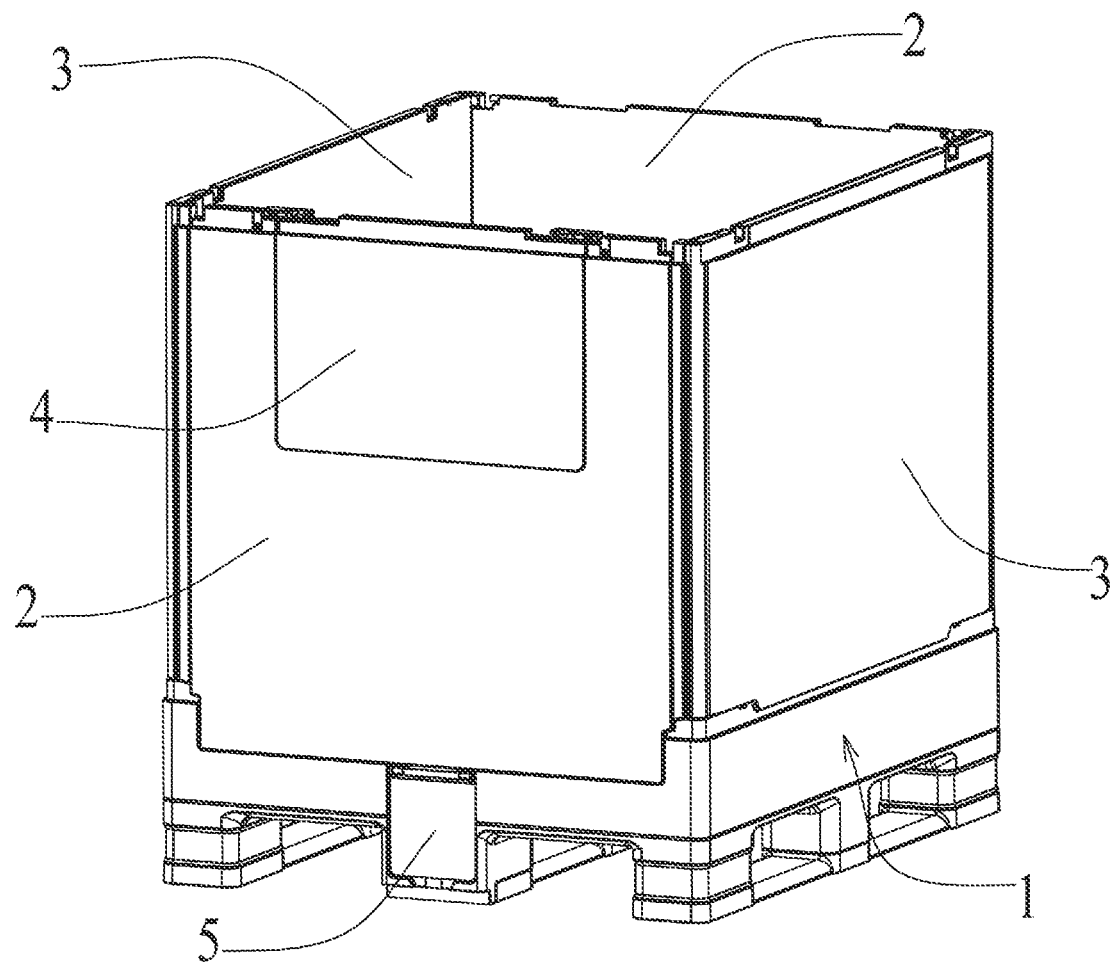
FIG. 1 is a perspective view of a container according to one embodiment of the present invention.

The preferred embodiment of this invention will be described in detail with reference to the accompanying drawings, so that the purposes, the characteristics and the advantages of the invention can be more clearly understood. It should be understood that the embodiments shown in the figures are not intended to limit the scope of this invention, but illustrate the essential spirit of the technical solution of this invention.

In the following description, certain specific details are set forth for purposes of illustrating the various disclosed embodiments to provide a thorough understanding of the various disclosed embodiments. However, those skilled in this art will recognize that embodiments may be practiced without one or more of these specific details. In other instances, well-known devices, structures, and techniques associated with the present application may not be shown or described in detail to avoid unnecessarily obscuring the description of the embodiments.

Throughout the specification "one embodiment" or "one embodiment" means that a particular feature, structure, or characteristic described in connection with the embodiment is included in at least one embodiment. Therefore, the presence of "in one embodiment" or "in one embodiment" at various locations throughout the specification need not all refer to the same embodiment. Additionally, particular features, structures, or features may be combined in any manner in one or more embodiments.

In the following description, for clarity of illustration of the structure and mode of operation of the present invention, various directional terms will be used to describe the present invention, but words such as "front", "rear", "left", "right", "outer", "inner", "outward", "inward", "upper", "lower", and the like, should be understood as convenient terms and should not be construed as limiting terms.

The present invention generally relates to a container provided with a discharging port, which is provided with a covering door, the covering door is connected to the discharging port by a connecting device, wherein the connecting device comprises a fixing member, a transmission member and an elastic member. During the opening or closing process of the covering door, the covering door drives the transmission member to move outwardly, and the elastic member is compressed. When the covering door is completely opened or closed, the elastic member springs back and the transmission member moves inwardly, thereby ensuring that the covering door automatically keeps open or closed. The overall structure of the container is novel and reliable, and the operation thereof is simple. There is no need to confirm whether the covering door is attracted in place during the opening or closing process of the covering door, which can effectively avoid human operation errors.

The container of the present invention can be a composite intermediate bulk container (IBC), which is a kind of packaging turnover container widely used in the food, biochemical, pharmaceutical, chemical and other industries internationally. Since the IBC container can be used repeatedly for many times, it has obvious advantages in filling, storage and transportation, and compared with the bucket, the IBC container can save 35% of the storage space, and the size conforms to the ISO standard. It is not only suitable for aseptic canning, but also has a compact box, which is convenient for safe and efficient storage in large quantities. Therefore, it is widely used in the transportation, packaging and storage of liquid, granule and flake materials. At present, there are three existing specifications: 820L, 1000L, and 1250L. Usually, its composition structure includes a plastic inner liner, a filling port, a discharging valve, side panels, a bottom plate and a covering plate. Since most of the liquids or particles stored in the IBC are pharmaceutical intermediates, beverage concentrates, food additives and even hazardous materials, which are not only expensive but also related to hygiene and safety, a covering door is required to block the discharging port during use.

According to one aspect of the present invention, it mainly relates to a container, comprising a base and side panels, the base or the side panel is provided with a discharging port, the discharging port is provided with a covering door, which is connected to the base or the side panel through a connecting device, the connecting device includes an elastic member, which is elastically deformed during the opening or closing process of the covering door, and when the covering door is completely opened or closed, the elastic member resets and drives the covering door to automatically keep open or closed. For example, one end of the elastic member is directly connected to the covering door, and the other end of the elastic member is directly connected to the base or the side panel, when the covering door is opened or closed, the elastic member is elongated, when the covering door is opened to a horizontal position, under the action of the elastic force of the elastic member, the covering door can continue to be turned over upwardly to automatically keep open, or under the action of the elastic force, the covering door falls back and automatically keeps closed.

According to a second aspect of the present invention, it relates to a container comprising a base and side panels, the base or the side panel is provided with a discharging port, the discharging port is provided with a covering door, which is connected to the base or the side panel through a connecting device, the connecting device includes a transmission member and an elastic member. During the opening or closing process of the covering door, the covering door can drive the transmission member to move outwardly, so that the elastic member is compressed. When the covering door is completely opened or closed, the elastic member springs back and drives the transmission member to move inwardly, and the door automatically keeps open or closed.

The second aspect of the present invention will be described below mainly with reference to the accompanying drawings.

One embodiment of the present invention will be described in detail below with reference to FIGS. 1-16.

Figure 2:
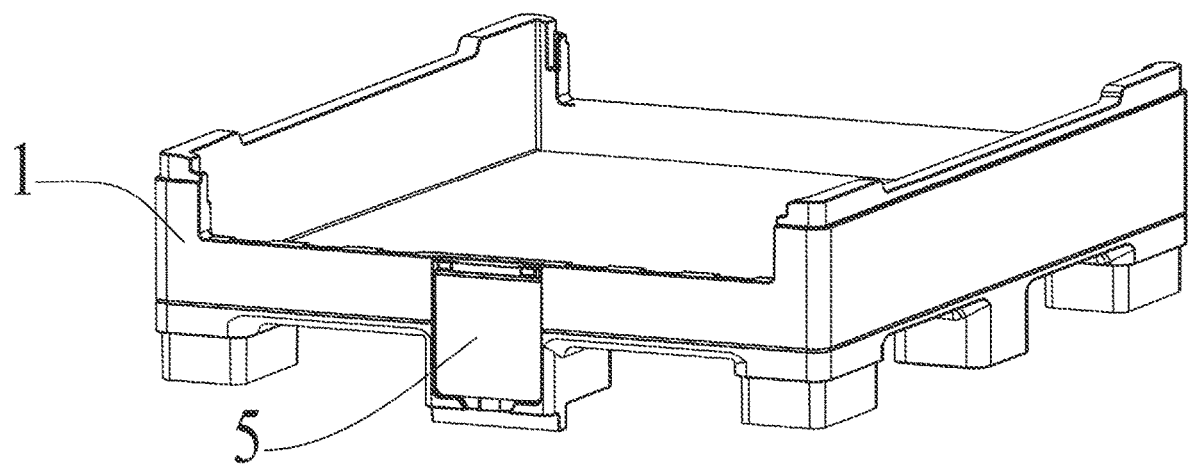
FIG. 2 is a perspective view of the base of FIG. 1.
Figure 3:
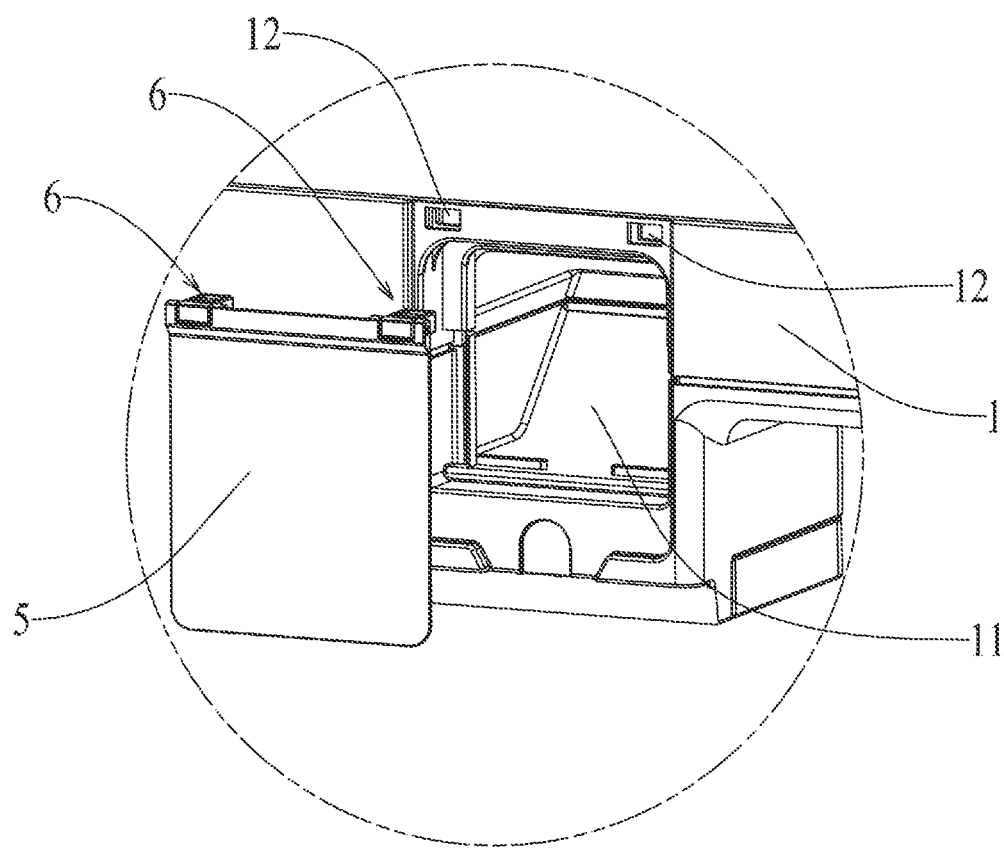
FIG. 3 is a partial perspective exploded view of the base of FIG. 1.
Figure 4:
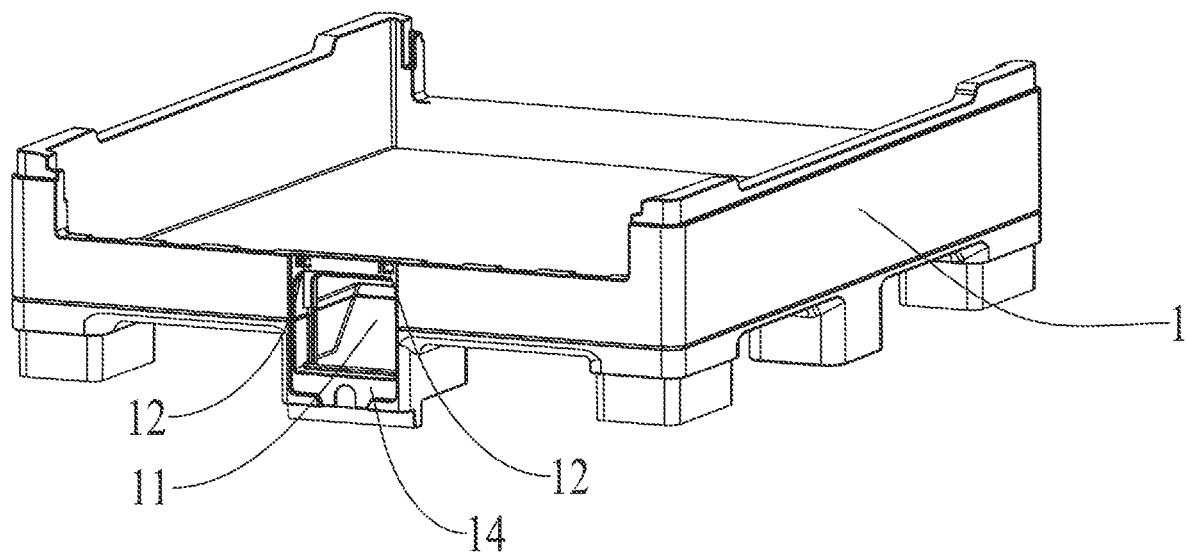
FIG. 4 is a perspective view of the base with the covering door removed.

FIG. 1 is a perspective view of a container 100 according to one embodiment of the present invention, FIG. 2 is a perspective view of the base 1 of FIG. 1, FIG. 3 is a partially exploded perspective view of the base 1 of FIG. 1, and FIG. 4 is a perspective view of the base with the covering door removed. As shown in FIGS. 1-4, the container 100 includes a base 1 and two pairs of opposing side panels 2 and 3. A small door 4 is provided on one of the side panels 2. A pair of opposing side panels 2 and 3 can be folded relative to the base 1. The base 1 is provided with a discharging port 11 which is usually arranged on one side of the base where the small door 4 is located below. The discharging port 11 is provided with a covering door 5 through which dustproof and anti-tampering effects are achieved.

Referring to FIGS. 3-4, the covering door 5 is connected to the discharging port 11 through a connecting device 6. Specifically, the discharging port 11 is provided on one side of the base 1, and a covering door accommodating cavity 14 is provided on the outerside of the discharging port 11, two grooves 12 are provided on two sides of the upper portion of the covering door accommodating cavity 14 respectively, one end of the connecting device 6 is rotatably connected with the covering door 5, and the other end of the connecting device 6 is installed in the groove 12.

Figure 5:
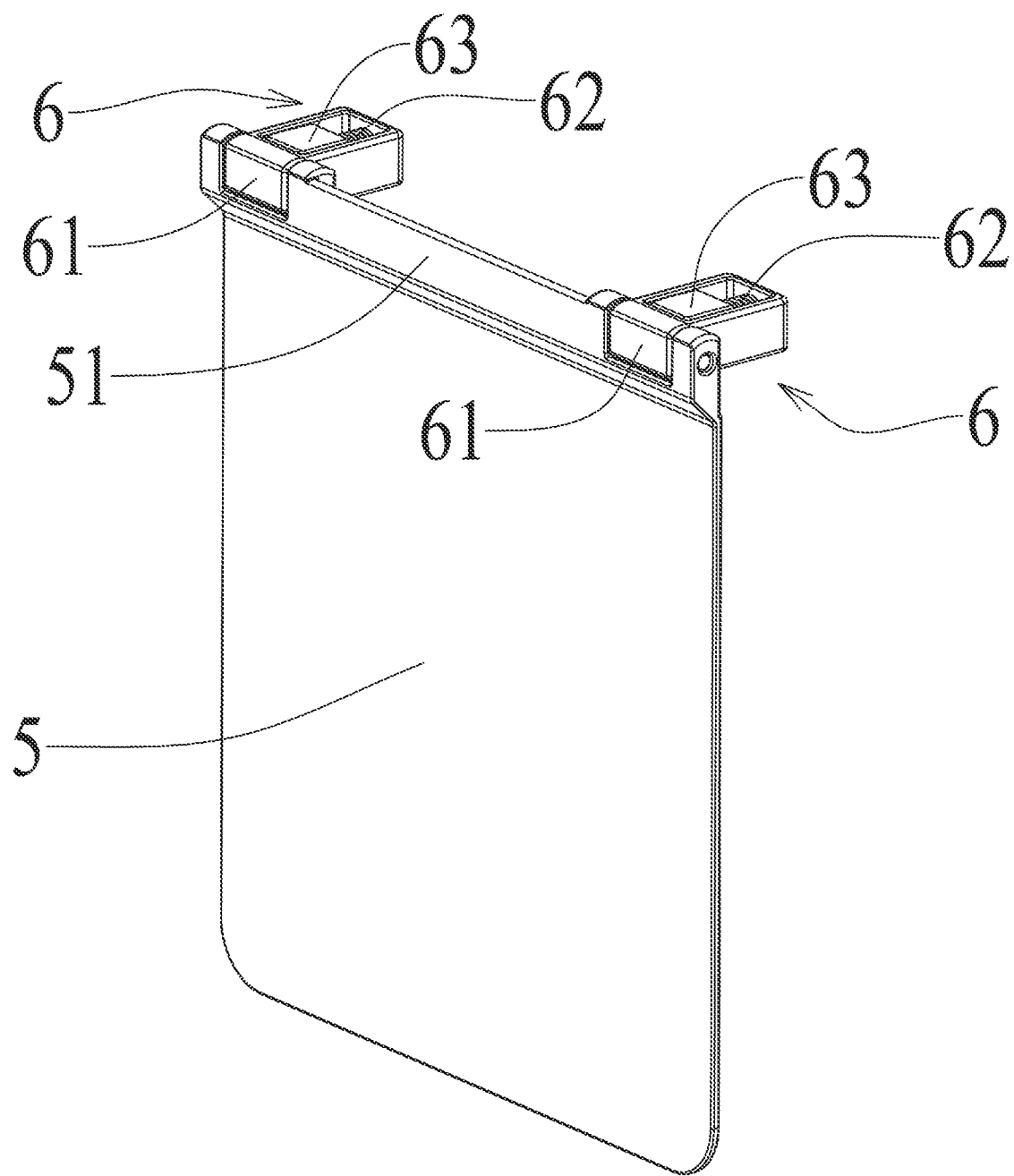
FIGS. 5-6 are perspective views of a covering door provided with a connecting device from different angles.
Figure 6:
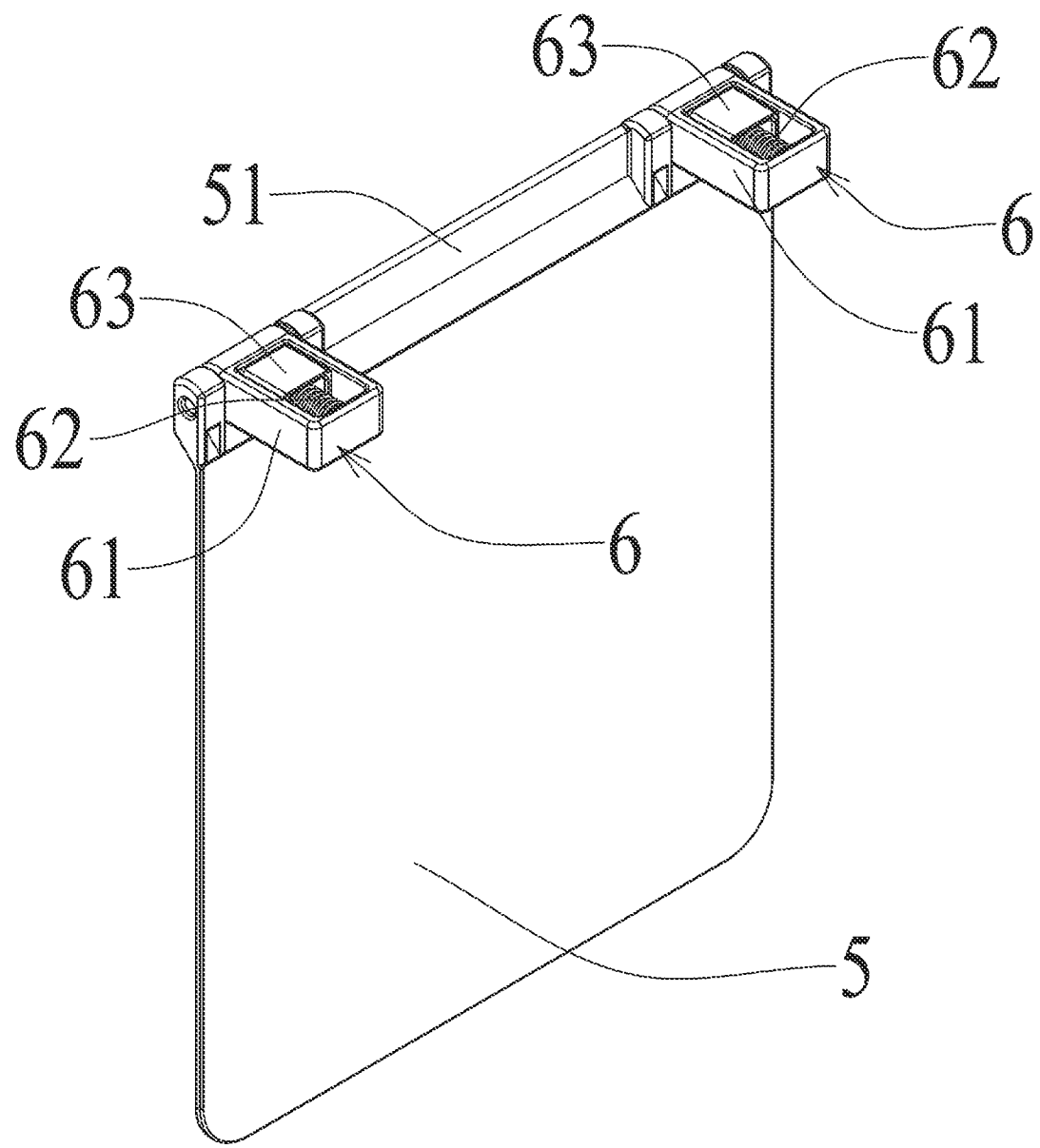
Figure 7:
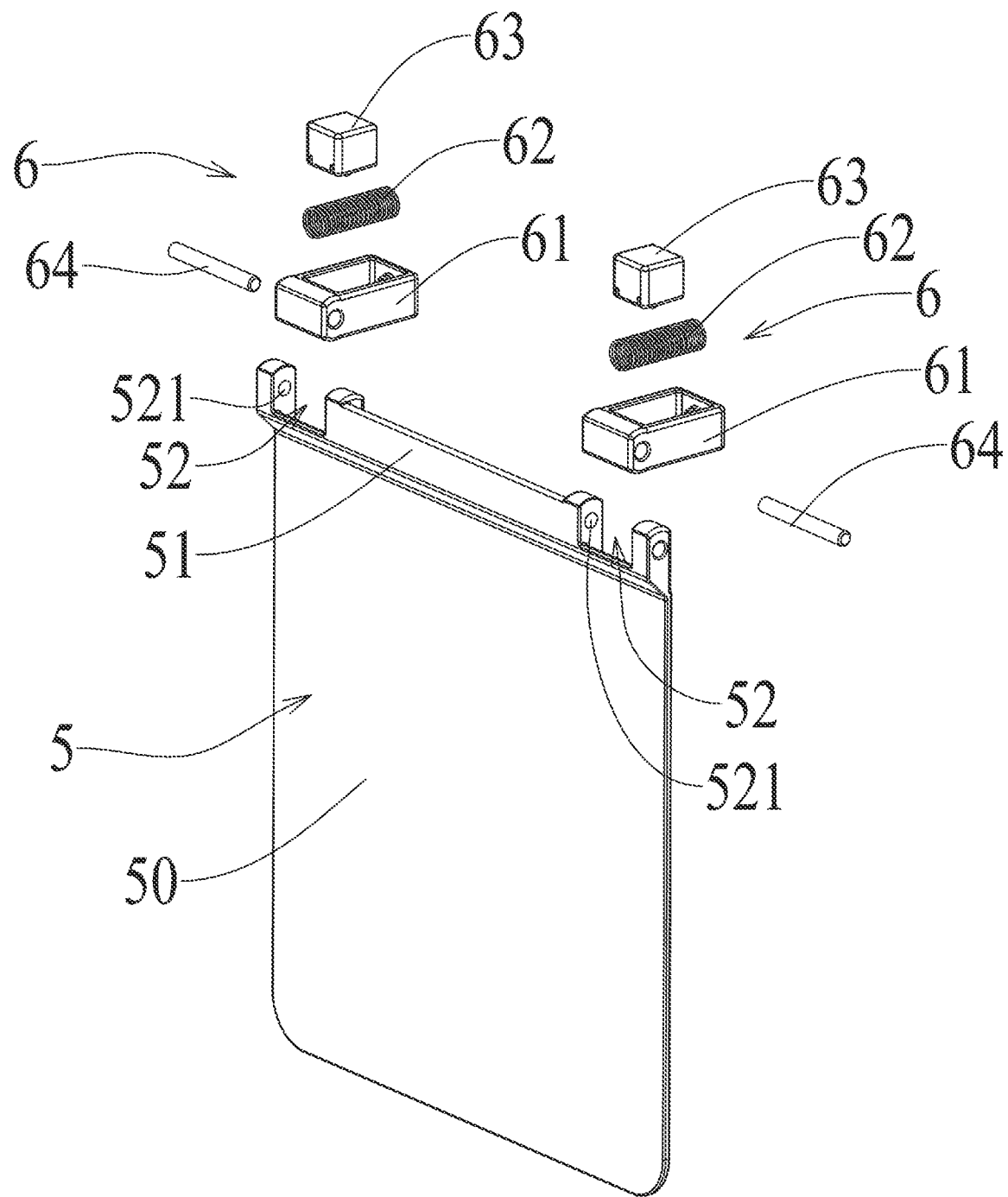
FIG. 7 is an exploded perspective view of the covering door provided with the connecting device shown in FIGS. 5-6.

FIGS. 5-6 are perspective views of the covering door 5 provided with the connecting device 6 from different angles, and FIG. 7 is an exploded perspective view of the covering door 5 provided with the connecting device 6 of FIGS. 5-6. As shown in FIGS. 5-7, the covering door 5 is plate-shaped and includes a covering plate 50, one end of the covering plate 50 is provided with a protruding portion 51, and two sides of the protruding portion 51 are respectively provided with connecting grooves 52. The two sides of the connecting groove 52 are respectively provided with shaft holes 521, and the cross-sections of the top portions of the protruding portions 51 at two sides of the connecting groove 52 are arc-shaped.

Figure 8:
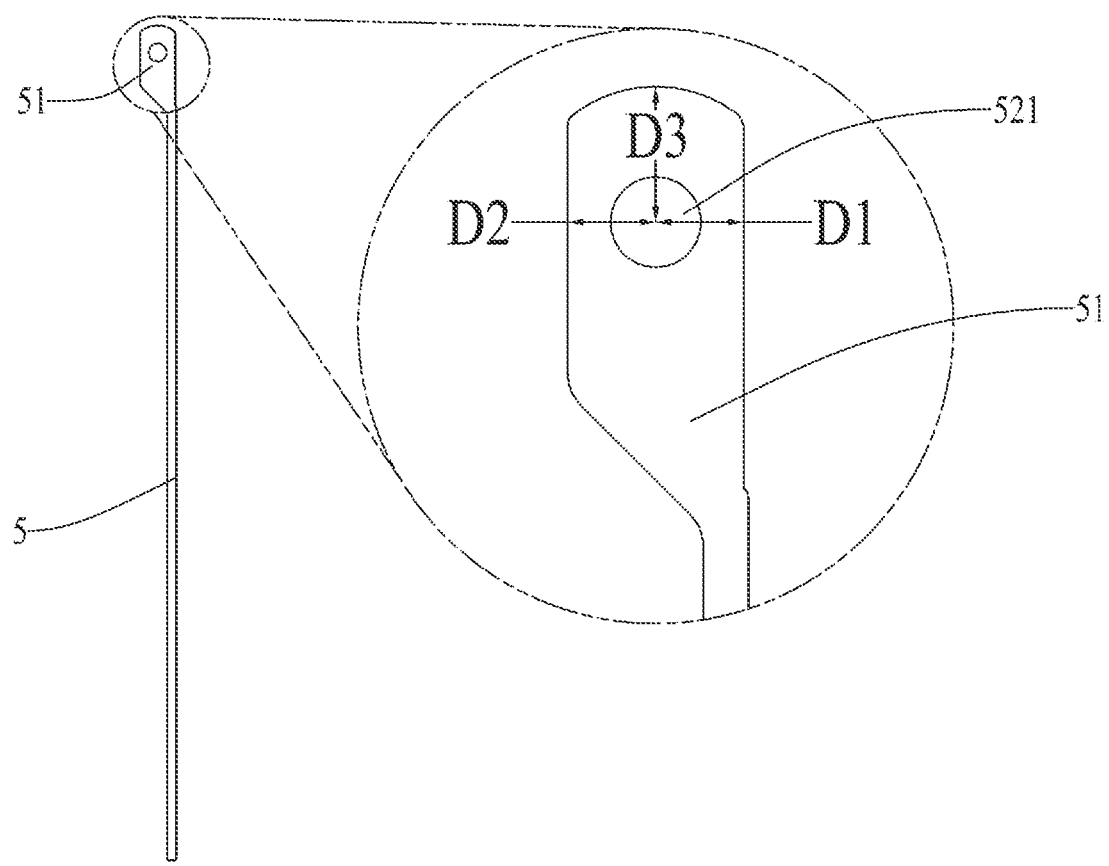
FIG. 8 is a partially enlarged schematic view of the covering door.

FIG. 8 is a partially enlarged schematic view of the covering door. Referring to FIG. 8, assuming that the distance between the shaft hole 521 and a top end of the covering plate 50 is D3, the distance between the shaft hole 521 and the bottom surface of the covering plate 50 is D1, and the distance between the shaft hole 521 and the front surface of the covering plate 50 is D2, then D3 is greater than D2 and also greater than D1, where D1 and D2 are not limited specially, and can be equal or different.

The advantages of such setting are: firstly, when the covering plate 50 starts to turn over, the transmission member 61 will be driven to move outwardly, and the elastic member 62 is compressed; when the covering plate 50 is turned over to a certain angle (exceed the apex of the arc on the top end of the covering plate 50), the elastic member 62 starts to spring back, and drives the transmission member 61 to move inwardly to drive the covering plate 50 to keep open or closed; secondly, since the protruding portion 51 on the covering plate 50 is a boss whose front surface protrudes upward, when the covering plate 50 is in the closed state, the covering plate 50 retracts into the side of the box to avoid friction and collision and extend the service life. When the covering plate 50 is in the open state, the covering plate 50 abuts against the side panel of the box or located in the corresponding accommodating cavity in the side panel, which can protect the covering plate 50 and extend the service life.

Continuing to refer to FIGS. 5-7, the connecting device 6 generally includes a transmission member 61, an elastic member 62 and a fixing member 63. One end of the transmission member 61 is rotatably connected to the covering door 5, and the other end of the transmission member 61 extends into the groove 12 in the base 1, and the elastic member 62 and the fixing member 63 are arranged in the transmission member 61. During the opening or closing process of the covering door 5, the covering door 5 drives the transmission member 61 to move outwardly, and the elastic member 62 is compressed. When the covering door 5 is completely opened or closed, the elastic member 62 springs back and the transmission member 61 moves inwardly, thereby ensuring that the covering door automatically keeps open or closed.

Specifically, the top of the covering door 5 is provided with a protruding portion 51, two sides of the protruding portion 51 are respectively provided with a connecting groove 52, and the transmission member 61 is rotatably connected in the connecting groove 52. In this embodiment, the connecting groove 52 is provided with a shaft hole 521, the connecting device 6 further includes a pin shaft 64, one end of the transmission member 61 is provided with a pin shaft hole 612, and the main part of the pin shaft 64 penetrates into the pin shaft hole 612 and both ends thereof extend into the shaft holes 521 in the connecting groove 52, so as to connect the transmission member 61 with the covering door 5 rotatably. However, those skilled in the art can understand that the pin shafts 64 may not be provided separately, but the pin shafts are integrally protruded from both ends of the transmission member 61.

Figure 9:
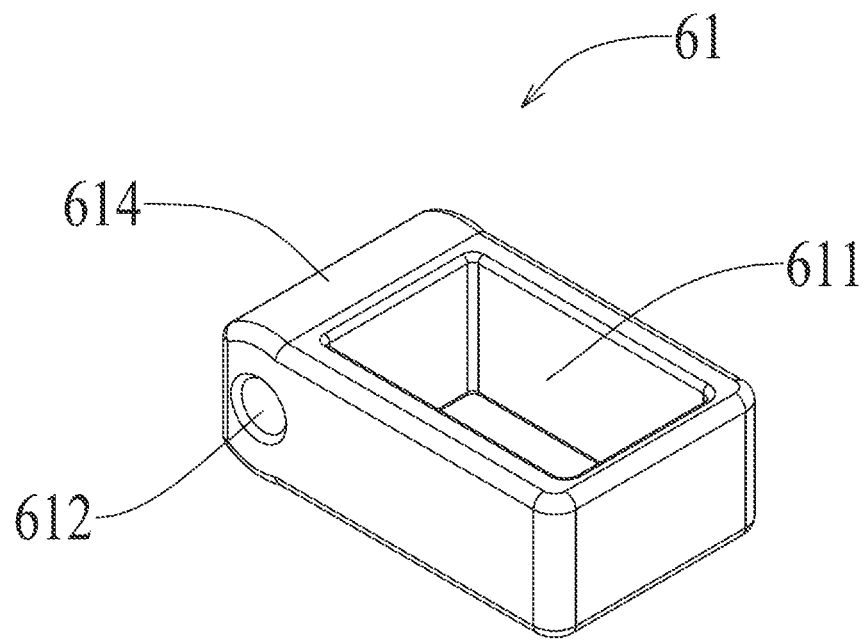
FIGS. 9-10 are perspective views of a transmission member according to one embodiment of the present invention from different angles, respectively.
Figure 10:
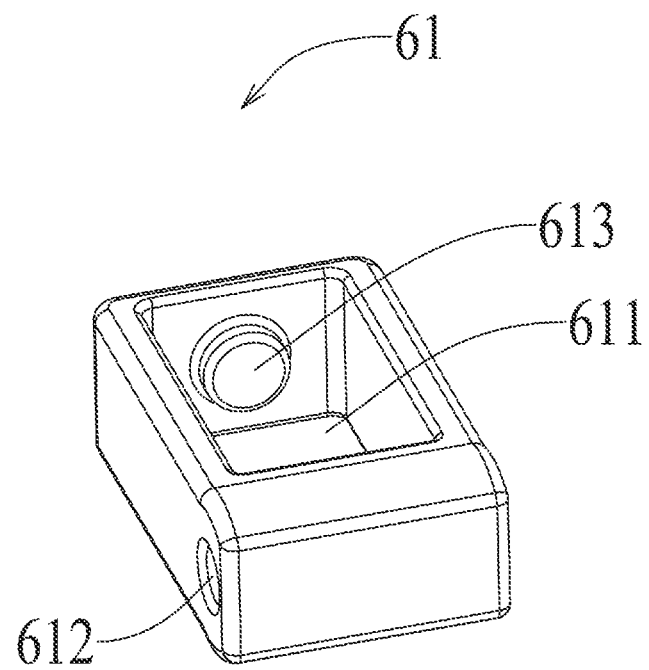

The specific structure of the transmission member 61 will be described below with reference to FIGS. 9-10. FIGS. 9-10 are respectively perspective views of the transmission member 61 according to one embodiment of the present invention from different angles. As shown in FIGS. 9-10, the transmission member 61 is formed as a whole in a rectangular parallelepiped structure and is provided with a mounting hole 611. An elastic member mounting portion 613 is provided on the end wall of the mounting hole 611. For example, the elastic member 62 is a spring, and the elastic member mounting portion 613 is a mounting protrusion, and an end of the spring is sleeved over the mounting protrusion. The end of the mounting hole 611 of the transmission member 61 is provided with a pin shaft hole 612, and the pin shaft hole 612 extends from the left side to the right side in the figure of the transmission member 61. The end of the transmission member 61 where the pin shaft hole 612 is provided is provided with an arc surface 614, and the bottom of the connecting groove 52 of the covering door 5 is in contact with the arc surface 614 when the covering door 5 is rotated to open or close.

Figure 11:
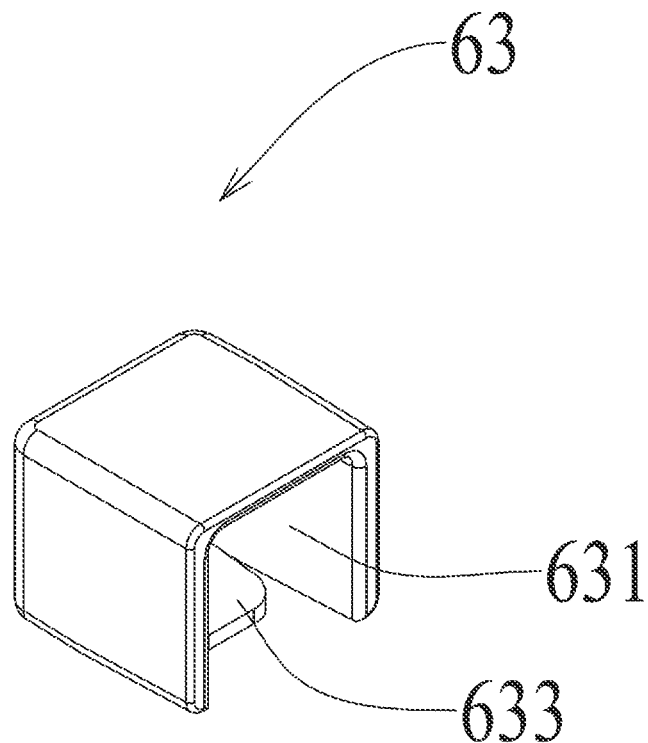
FIGS. 11-12 are perspective views of a fixing member according to an embodiment of the present invention from different angles, respectively.
Figure 12:
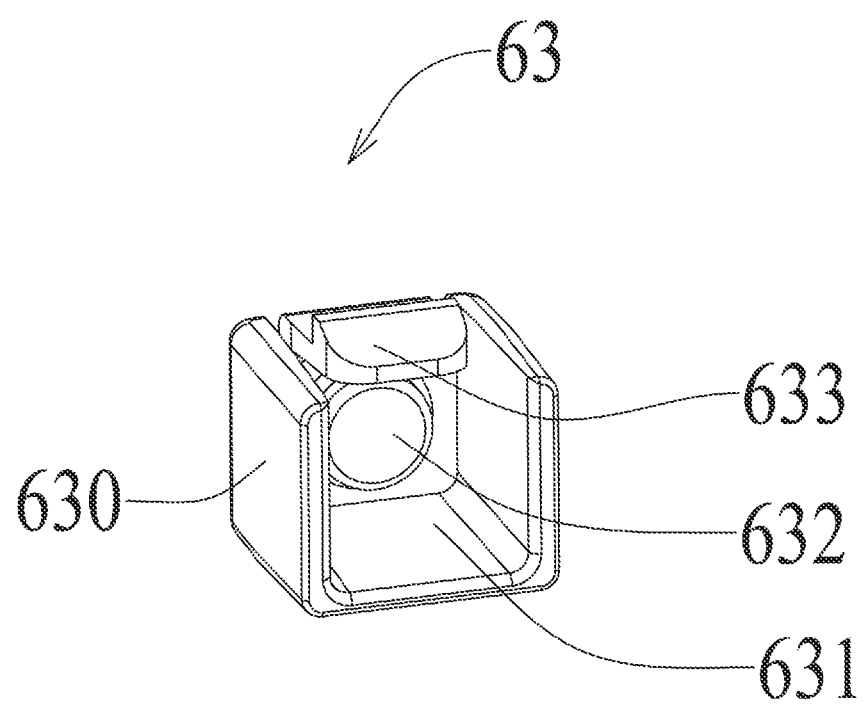

The specific structure of the fixing member 63 will be described below with reference to FIGS. 11-12. FIGS. 11-12 are perspective views of the fixing member 63 according to an embodiment of the present invention from different angles, respectively. As shown in FIGS. 11-12, the fixing member 63 includes a main body 630 which is provided with an opening 631, a buckle 633 is provided at one end of the opening 631, the other end of the opening 631 is kept open, and a boss 632 is provided at a side of the buckle 633 facing the opening, and the boss 632 is used to install the other end of the elastic member. For example, the elastic member is a spring, and one end of the spring is sleeved over the elastic member mounting portion 613 in the transmission member 61, and the other end is sleeved over the boss of the main body 630.

Referring back to FIGS. 5-7, the pin shaft hole 612 at one end of the transmission member 61 and the shaft hole 521 in the covering plate 50 are connected with the pin shaft 64 cooperatively and rotatably, and the other end of the transmission member 61 extends into the groove of the base 1, the fixing member 63 and the elastic member 62 are located in the mounting hole 611 of the transmission member 61. Referring to FIGS. 13-16, a buckle groove 13 is provided in the groove 12 of the base 1, the buckle 633 on the fixing member 63 is fixed with the buckle groove 13 of the base 1, and the one end of the elastic member 62 is fixed with the elastic member mounting portion 613 in the mounting hole 611 of the transmission member 61, the other end is fixed with the boss 632 on the fixing member 63. During the opening or closing process of the covering door 50, the covering door 50 rotate around the pin shaft 64 to drive the transmission member 61 to move outwardly, and the elastic member 62 is compressed. When the covering plate 50 is completely opened or closed, the elastic member 62 springs back and the transmission member 61 moves inwardly, thereby ensuring that the covering door automatically keeps open or closed.

FIGS. 13-16 show the process of the covering door 5 from the closed state to the open state, and the process of the covering door from closing to opening will be described below with reference to FIGS. 13-16.

Figure 13:
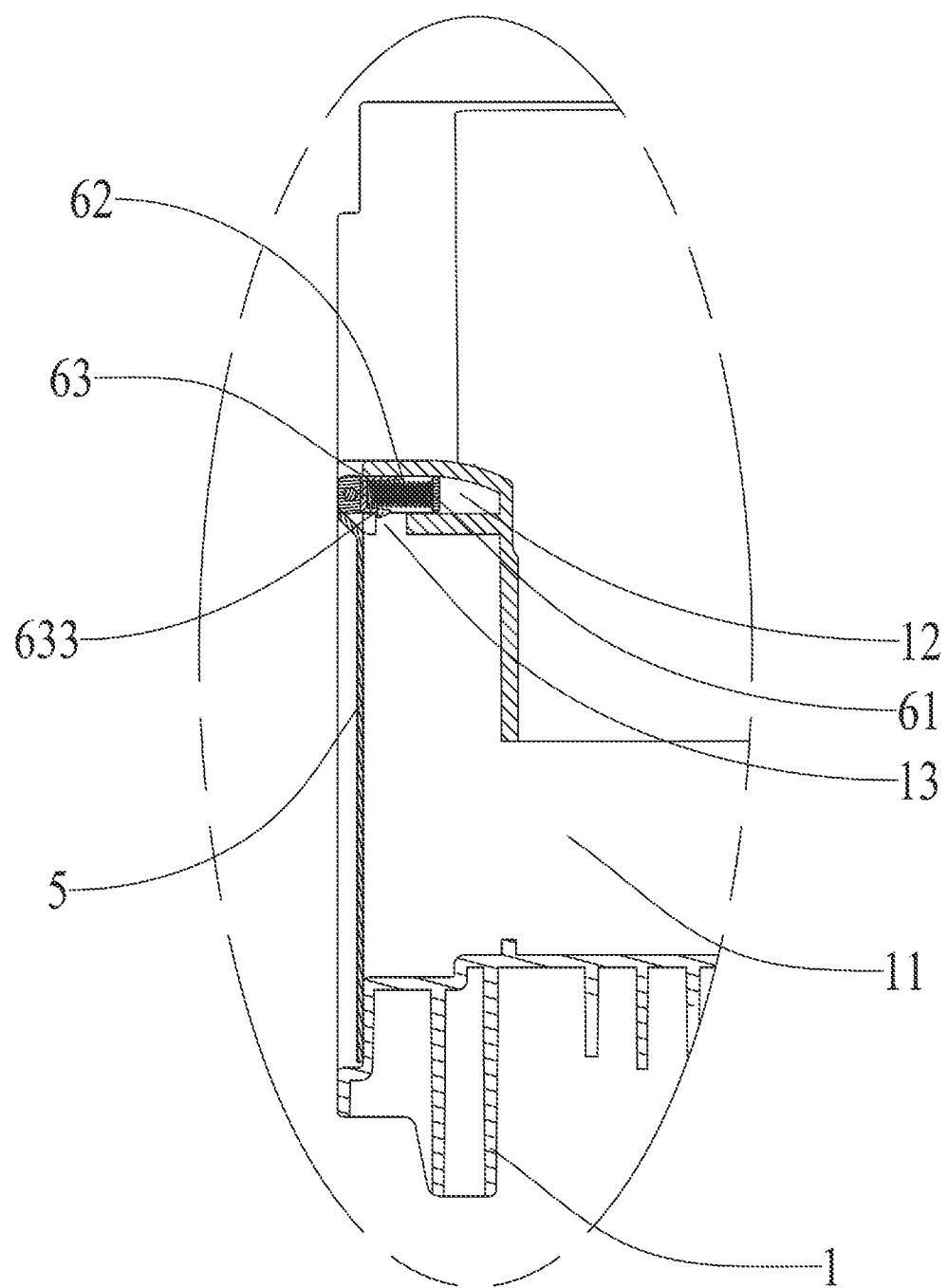
FIGS. 13-16 illustrate the process of the covering door from the closed state to the open state.

FIG. 13 shows that the covering door 5 is in a closed state. As shown in FIG. 13, the transmission member 61 is located in the groove 12 on the base 1, and the transmission member 61 can move in the groove 12. In particular, the buckle 633 on the fixing member 63 is fixedly connected with the buckle groove 13, so that the covering door 5 is fixedly connected with the base 1 as a whole.

Figure 14:
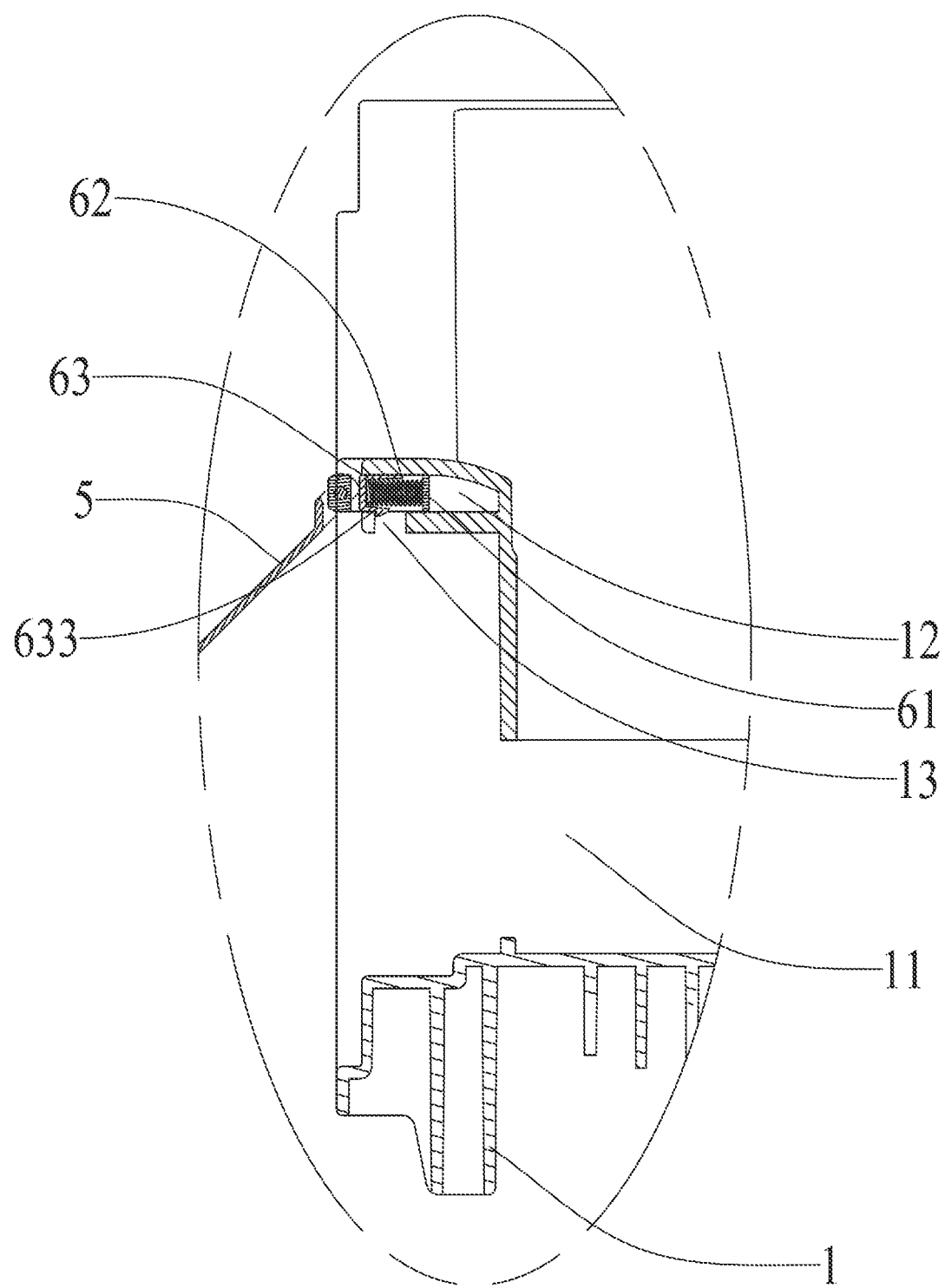

FIG. 14 shows the state in which the covering plate 50 is turned over upwardly by 45°. As shown in FIG. 14, the covering plate 50 rotates upwardly around the pin shaft 64. Due to the structural characteristics of the covering plate 50 (D3 is greater than D2 and D1), the arc surface of the top end of the covering plate 50 abuts against the side surface of the base 1, thereby driving the transmission member 61 to move outwardly, and the elastic member 62 is in a compressed state. Assuming that the external force for turning over upwardly is cancelled at this time, the elastic member 62 will spring back, thereby driving the transmission member 61 to move inwardly, and the covering plate 50 will automatically turn over downwardly to keep closed.

Figure 15:
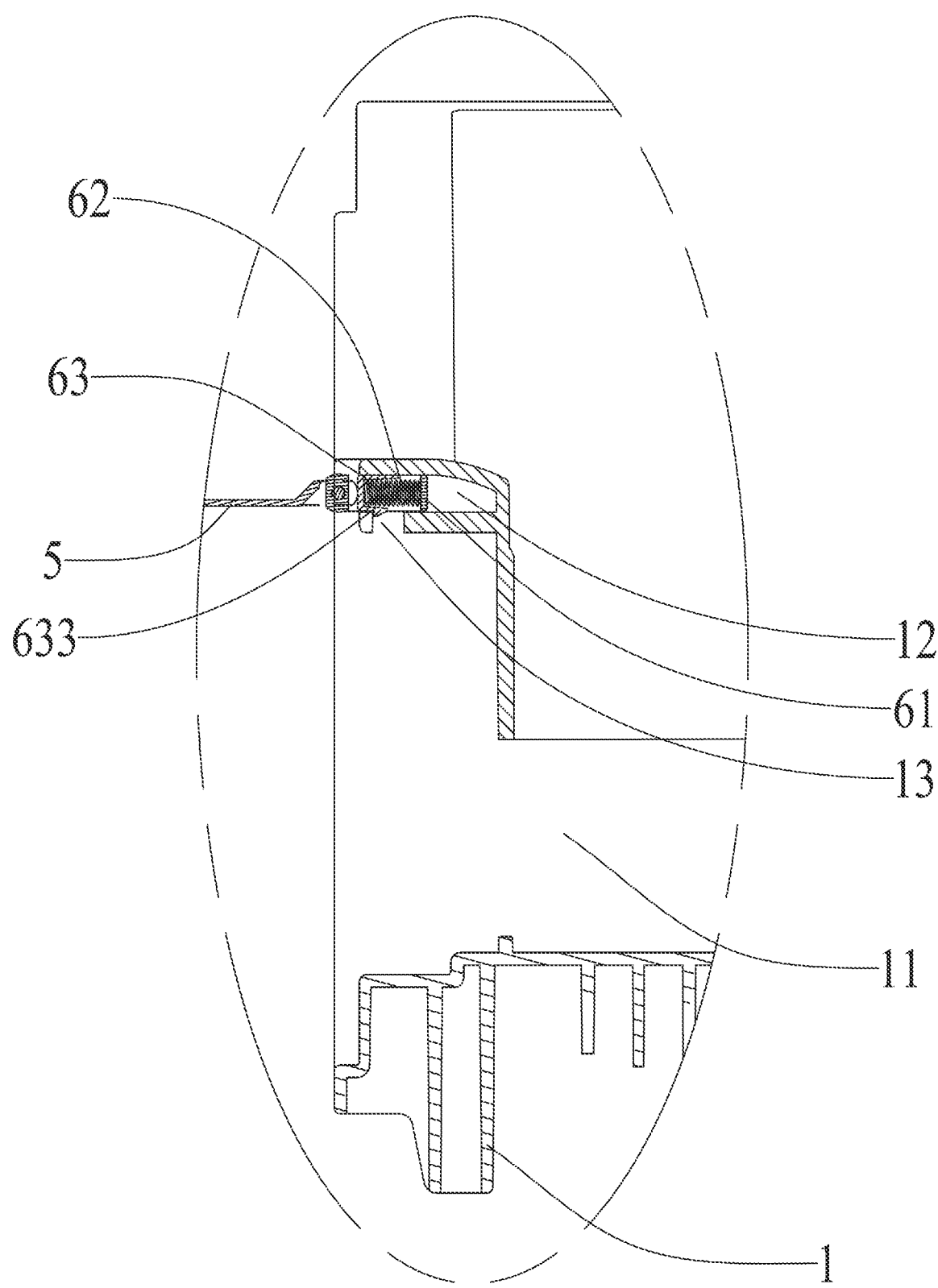

FIG. 15 shows the state in which the covering plate 50 is turned over upwardly by 90°. As shown in FIG. 15, at this time, the arc surface of the top end of the covering plate 50 abuts against the side surface of the base 1, and the elastic member 62 is compressed to the largest extend. If the external force for turning over upwardly is cancelled, the elastic member 62 will spring back, thereby driving the transmission member 61 to move inwardly, and the covering plate 50 will automatically turn over upwardly or downwardly to keep closed or open (in practical use, due to the effect of gravity, the covering plate will tend to turn over downwardly, and the critical angle of turning over upwardly or turning over downwardly of the covering plate is larger than 90°.

Figure 16:
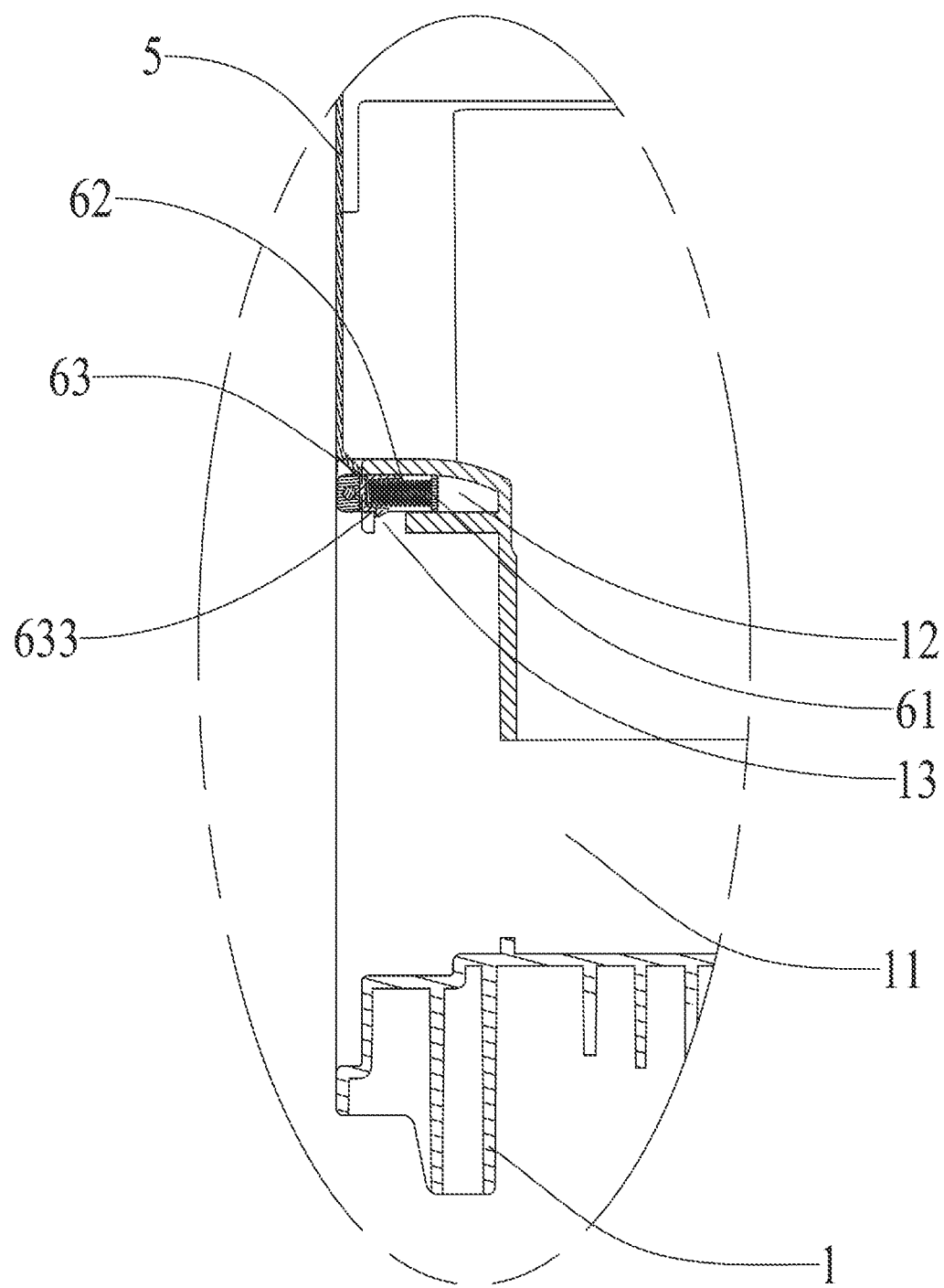

FIG. 16 shows the state that the cover is kept open. As shown in FIG. 16, at this time, the front surface of the protruding part 51 on the covering plate 50 abuts against the side of the base 1, the covering plate 50 abuts against the side panel of the box, and the elastic member 62 is in a spring back state.

It should be noted that, although in the above embodiment the discharging port is provided in the base, those skilled in the art can understand that the discharging port can also be provided in the side panel, and in this case, the corresponding structure of the discharging port provided on the base will be moved to the side panel, for example, the groove, the accommodating cavity of the buckle, etc. are also arranged in the side panel, and the arrangement of the discharging port in the side panel will not affect the realization of the present invention. In addition, in the above embodiment, the side panel of the container is provided with a small door, however, those skilled in the art can understand that the side panel may not be provided with a small door.

It should also be noted that, in the above embodiment, the side panel and the base can be folded with each other, and when the container is empty, the space occupied by the container can be reduced by folding the side panel onto the base. Of course, the side panel and the base may not be folded with each other, and these situations will not affect the realization of the technical solution of the present invention.

To sum up, the discharging port of the container of the present invention adopts the form of a covering plate, a fixed member, a transmission member and an elastic member that cooperate with each other. During the opening or closing process of the covering plate, the covering plate drives the transmission member to move outwardly, and the elastic part is compressed. When the covering plate is completely opened or closed, the elastic member springs back and the transmission member moves inwardly, thereby ensuring that the covering door automatically keep open or closed. The overall structure of the container is novel and reliable, and the operation thereof is simple. There is no need to confirm whether the covering door is attracted in place during the opening or closing process of the covering door, which can effectively avoid human operation errors.

The preferred embodiments of the present invention have been described in detail above, but it should be understood that after reading the above teaching content of the present invention, those skilled in the art can make various changes or modifications to the present invention. Such equivalents also fall within the scope defined by the claims appended hereto.

The invention claimed is:

1. A container, comprising a base and side panels, the base or the side panel is provided with a discharging port, the discharging port is provided with a covering door, and the covering door is connected to the base or the side panel by a connecting device, wherein, the connecting device comprises a transmission member and an elastic member; wherein during the opening or closing process of the covering door, the transmission member is driven to move outwardly, so that the elastic member is compressed; when the covering door is completely opened or closed, the elastic member springs back and drives the transmission member to move inwardly, and the covering door automatically keeps open or closed.

2. The container according to claim 1, wherein the side panel or the base is provided with an accommodating cavity for accommodating the covering door, the accommodating cavity is arranged in the outside of the discharging port, and the covering door is provided with an arc surface on the top thereof, and the arc surface cooperates with an outer surface of the top of the accommodating cavity during the opening or closing process of the covering door.

3. The container according to claim 1, wherein the covering door is rotated to open or close around an axis, and the distance between the axis and a top end of the covering door is greater than the distance between the axis and the bottom surface of the covering door and the distance between the axis and the front surface of the covering door.

4. The container according to claim 1, wherein the covering door is provided with a shaft hole, and the transmission member is rotatably connected to the covering door through a pin shaft, wherein the distance between the shaft hole and the top end of the covering door is greater than the distance between the shaft hole and the bottom surface of the covering door and the distance between the shaft hole and the front surface of the covering door.

5. The container according to claim 4, wherein the connecting device further comprises a pin shaft, and one end of the transmission member is provided with a pin shaft hole, the transmission member is rotatably connected with the covering door through cooperation of the pin shaft with the pin shaft hole in the transmission member and the shaft hole in the covering door.

6. The container according to claim 5, wherein, the end of the transmission member where the pin shaft hole is provided is provided with an arc surface, and during the opening or closing process of the covering door, the bottom of the connection groove in the covering door cooperates with the arc surface.

7. The container according to claim 1, wherein the discharging port is provided in the base, and the base is further provided with an accommodating cavity for accommodating a covering door, the accommodating cavity is arranged in the outside of the discharging port, grooves are respectively provided on both sides of the upper portion of the accommodating cavity, one end of the connecting device is rotatably connected to the covering door, and the other end of the connecting device is installed in the groove.

8. The container according to claim 7, wherein, the connecting device further comprises a fixing member, the bottom of the groove is provided with a buckle groove, the fixing member is provided with a buckle, and the fixing member is fixedly connected to the base through the cooperation between the buckle and the buckle groove.

9. The container according to claim 7, wherein the covering door comprises a covering plate, one end of the covering plate is provided with a protruding portion, two sides of the protruding portion are respectively provided with connecting grooves, and one end of the connecting device is rotatably connected in the connecting groove.

10. The container according to claim 9, wherein the top ends of the protruding portions at both sides of the connecting groove are provided with arc surfaces, and the arc surfaces cooperate with the outer surface of the top of the accommodating cavity during the opening and closing process of the covering door.

11. The container according to claim 9, wherein the protruding portion is a boss whose front surface protrudes upwardly, and when the covering plate is in a closed state, the covering plate sinks into the accommodating cavity in the side of the base.

12. The container according to claim 8, wherein the transmission member is provided with a mounting hole, a side wall of the mounting hole is provided with an elastic member mounting portion, and the fixing member and the elastic member are mounted in the mounting hole, wherein the fixing member is provided with an opening, a boss is provided in the opening, one end of the elastic member is installed on the elastic member mounting portion, and the other end of the elastic member is installed on the boss.

13. The container according to claim 12, wherein the boss of the fixing member is disposed on a side wall of the buckle facing the opening.

14. The container according to claim 12, wherein the elastic member is a spring, one end of the spring is fixed on the mounting portion of the transmission member, and the other end of the spring is fixed on the boss of the fixing member.

15. The container according to claim 1, wherein a small door is provided on the side panel, and the discharging port is provided on the base below the small door.

16. A container comprising a base and side panels, the base or the side panel is provided with a discharging port, the discharging port is provided with a covering door, the covering door is connected to the base or the side panel by a connecting device, wherein the connecting device includes an elastic member, the elastic member is elastically deformed during the opening or closing process of the covering door, and when the covering door is completely opened or closed, the elastic member resets and drives the covering door to automatically keep open or closed.

* * * * *